US011196776B2

(12) United States Patent
Gustafsson et al.

(10) Patent No.: US 11,196,776 B2
(45) Date of Patent: Dec. 7, 2021

(54) METHOD AND DEVICE FOR LAWFUL INTERCEPTION FOR PROXIMITY SERVICES

(71) Applicant: TELEFONAKTIEBOLAGET LM ERICSSON (PUBL), Stockholm (SE)

(72) Inventors: Roland Gustafsson, Bengtsfors (SE); Gunnar Rydnell, Gothenburg (SE); Shabnam Sultana, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 281 days.

(21) Appl. No.: 15/755,326

(22) PCT Filed: Aug. 26, 2016

(86) PCT No.: PCT/EP2016/070212
§ 371 (c)(1),
(2) Date: Feb. 26, 2018

(87) PCT Pub. No.: WO2017/032884
PCT Pub. Date: Mar. 2, 2017

(65) Prior Publication Data
US 2018/0248919 A1    Aug. 30, 2018

Related U.S. Application Data

(60) Provisional application No. 62/210,051, filed on Aug. 26, 2015.

(51) Int. Cl.
*H04L 29/06* (2006.01)
*H04W 76/14* (2018.01)
(Continued)

(52) U.S. Cl.
CPC ............. *H04L 63/306* (2013.01); *H04W 8/04* (2013.01); *H04W 12/80* (2021.01); *H04W 76/14* (2018.02); *H04W 88/04* (2013.01); *H04W 88/16* (2013.01)

(58) Field of Classification Search
CPC .... H04L 63/306; H04W 76/14; H04W 12/02; H04W 88/04; H04W 8/04; H04W 8/16
See application file for complete search history.

(56) References Cited

U.S. PATENT DOCUMENTS 10,015,718 B2  7/2018  Jin et al.
2010/0312841 A1  12/2010  Doken et al.
(Continued)

FOREIGN PATENT DOCUMENTS

CN    101945429 A    1/2011
CN    102422615 A    4/2012
(Continued)

OTHER PUBLICATIONS

International Search Report and Written Opinion issued in application No. PCT/EP2016/070212 dated Nov. 10, 2016, 10 pages.
(Continued)

*Primary Examiner* — Kodzovi Acolatse
*Assistant Examiner* — Farhad Ali
(74) *Attorney, Agent, or Firm* — Rothwell, Figg, Ernst & Manbeck, P.C.

(57) ABSTRACT

Method and system comprising a remote UE being connected to a relay UE, the system moreover comprising a HSS of the remote UE, an ADMF, a MME serving the relay UE and a GW. The relay UE is transmitting in a message (12) an identity of the remote UE (IMSI_1) and an IP address of the remote UE to the MME serving the remote UE. The MME transmitting in an update record message (14) for the remote UE (IM-SI_1); the identity of a relay UE (Continued)

and the identity of the MME serving the relay UE, to the HSS of the remote UE.

18 Claims, 6 Drawing Sheets

(51) Int. Cl.
*H04W 12/80* (2021.01)
*H04W 8/04* (2009.01)
*H04W 88/04* (2009.01)
*H04W 88/16* (2009.01)

(56) References Cited

U.S. PATENT DOCUMENTS

| | | | |
|---|---|---|---|
| 2014/0043980 A1 | 2/2014 | Anthony, Jr. et al. | |
| 2014/0044019 A1* | 2/2014 | Anthony, Jr. | H04L 43/00 370/259 |
| 2014/0213250 A1* | 7/2014 | Baek | H04W 8/005 455/434 |
| 2015/0009864 A1* | 1/2015 | Kim | H04W 12/02 370/259 |
| 2015/0326302 A1* | 11/2015 | Stojanovski | H04L 63/306 370/315 |

FOREIGN PATENT DOCUMENTS

| | | |
|---|---|---|
| CN | 102752830 A | 10/2012 |
| CN | 103228004 A | 7/2013 |
| EP | 2 629 482 A2 | 8/2013 |
| WO | 2014198063 A1 | 12/2014 |

OTHER PUBLICATIONS

3GPP TSG-SA WG3 LI Meeting #58, S2-152724, "LS on Requirement for Identifying Remote ProSe UE and its Subscriber in EPC", Revision of S3i1501228, Singapore, Singapore, Jul. 14-16, 2015, 1 page.

3GPP, 3rd Generation Partnership Project; Technical Specification Group Services and System Aspects; 3G Security; Lawful interception architecture and functions (Release 12), 3GPP TS 33.107, V12.11.0, Jun. 2015, 234 pages.

* cited by examiner

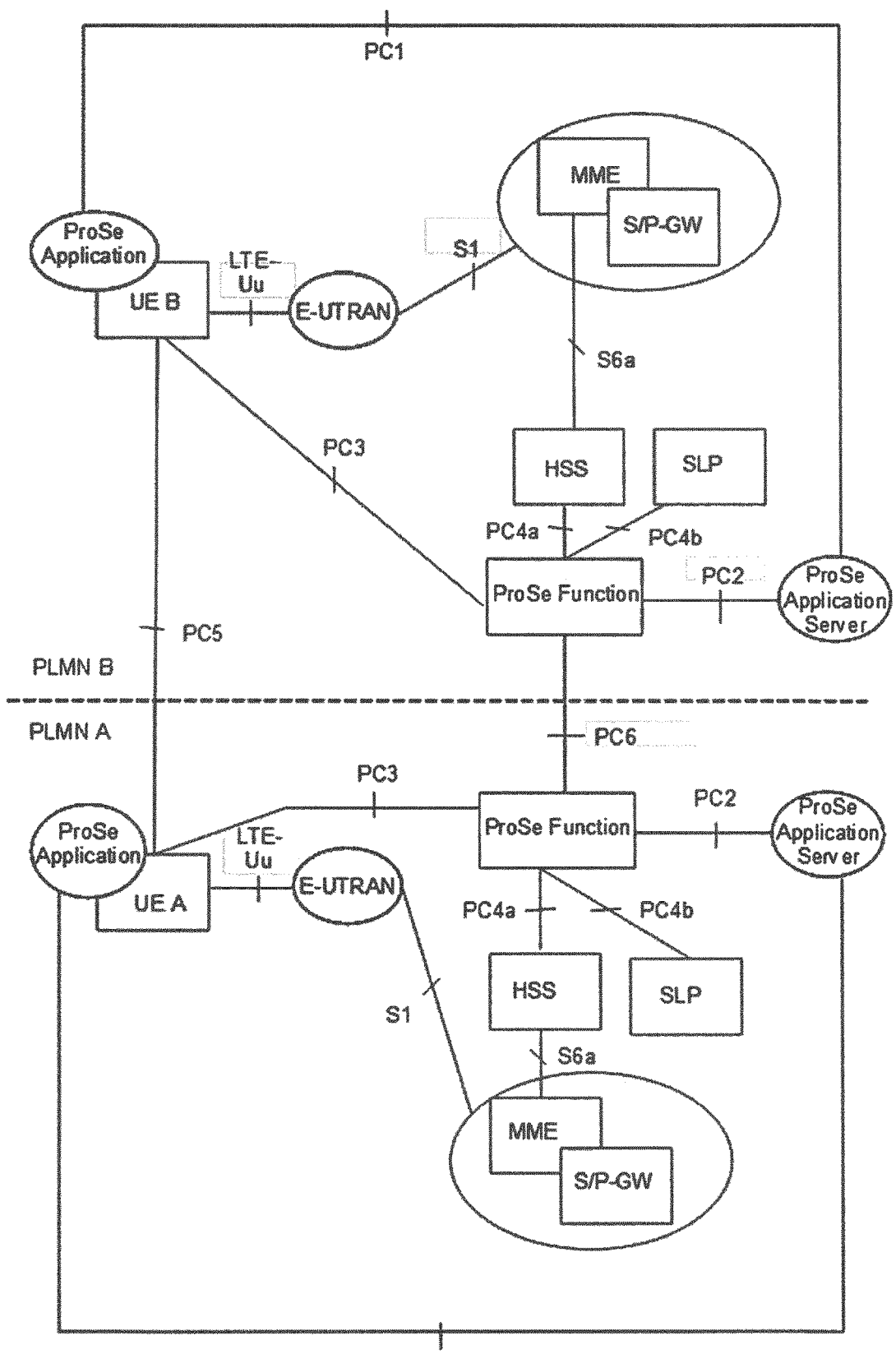
FIG. 1 – PRIOR ART – [3GPP TS 23.303 V13.0.0 (2015-06), fig. 4.2-2]

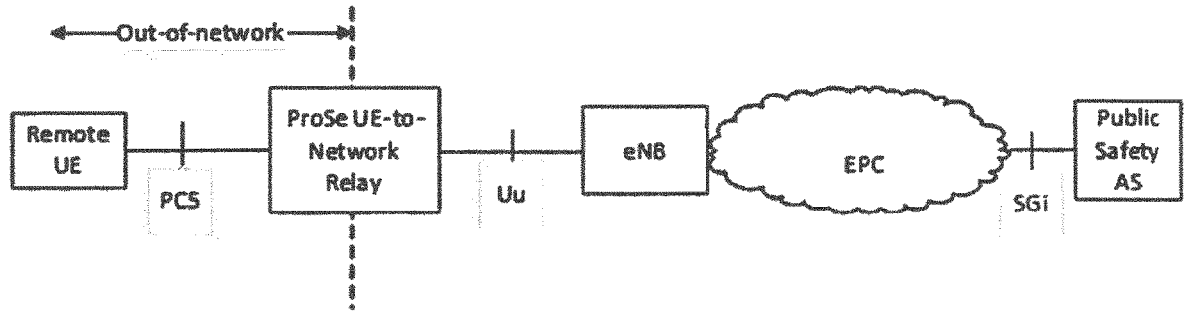
FIG. 2 – PRIOR ART – [3GPP
TS 23.303 V13.0.0 (2015-06),
fig. 4.4-3-1]
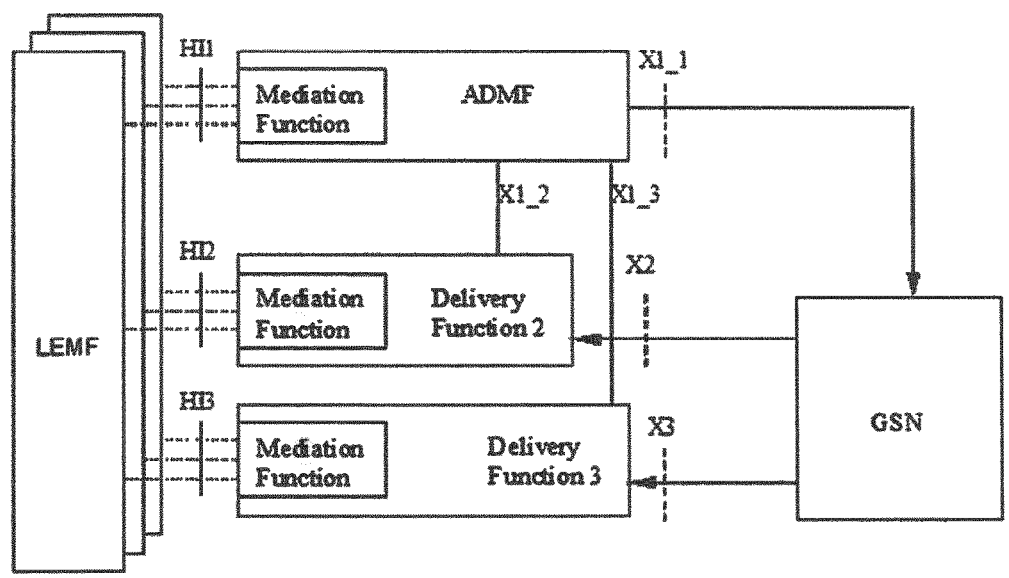
FIG. 3 – PRIOR ART – 3GPP
[TS 33.107 V12.11.0 (2015-06),
Fig. 1b - PACKET SWITCHED
INTERCEPT
CONFIGURATION]

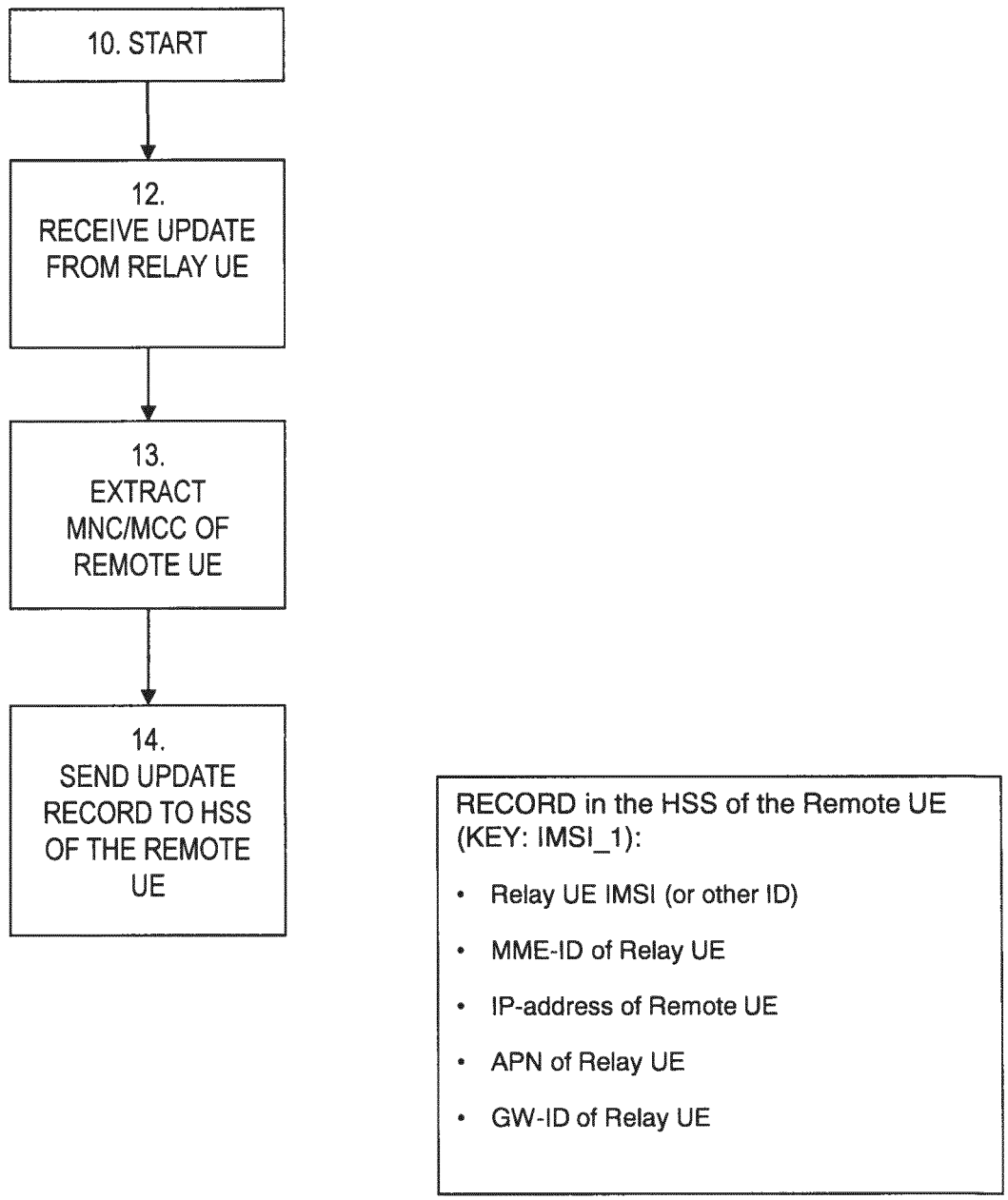
FIG. 4 – EMBODIMENT
- MME PROCEDURE FOR UPDATING HSS

METHOD AND DEVICE FOR LAWFUL INTERCEPTION FOR PROXIMITY SERVICES

CROSS REFERENCE TO RELATED APPLICATION(S)

This application is a 35 U.S.C. § 371 National Stage of International Patent Application No. PCT/EP2016/070212, filed Aug. 26, 2016, designating the United States and claiming priority to U.S. provisional application No. 62/210,051, filed on Aug. 26, 2015. The above identified applications are incorporated by this reference.

TECHNICAL FIELD

This invention is directed to proximity services. More particularly, the invention relates to User Entities, UE's, systems and methods where UEs do direct communication UE to UE by using a radio channel based on Long term evolution, LTE, technology.

BACKGROUND

3GPP specifies from Release 12, the functionality called Proximity Services, ProSe. This functionality includes methods for the User entities, UEs, to do direct communication from UE to UE by using a new radio channel based on LTE technology. For Public Safety (PS) users, it is allowed for two UEs to communicate directly between each other when there is no network coverage, i.e. when there is no radio base station in reach.

Proximity Services (ProSe) are services that can be provided by the 3GPP system based on UEs being in proximity to each other.

The 3GPP system enablers for ProSe include the following functions:
EPC (Evolved Packet Core)-level ProSe Discovery;
EPC support for WLAN (Wireless Local Area Network) direct discovery and communication;
Direct discovery;
Direct communication;
UE-to-Network Relay.

FIG. 1 is a representation of FIG. 4.2-3 of prior art document 3GPP TS 23.303 V13.0.0 (2015-06) showing the high level view of the non-roaming inter-PLMN (Home Public Mobile Network) architecture. In this figure, PLMN A is the HPLMN of UE A and PLMN B is the HPLMN of UE B. In this figure relaying between UE A and UE B is performed over interface PC5. Concerning further details, reference is made to this document.

When one of the Public Safety, PS UEs is within the coverage of an eNodeB radio base station and the other Public Safety, PS, UE is out of radio coverage from the NW, the first UE may act as a relay station between the out-of-coverage UE and the eNodeB. In this way the out-of-coverage UE will be able to communicate towards the PLMN without being in direct radio contact with a base station.

In the following, the out-of-coverage UE using a relaying UE for communicating towards the PLMN will be called the Remote UE. And the relaying UE will be called the UE-to-NW Relay UE.

FIG. 2 corresponds to FIG. 4.4.3-1: ProSe UE-to-Network Relay of 3GPP TS 23.303 V13.0.0 (2015-06). The ProSe UE-to-Network Relay entity provides the functionality to support connectivity to "unicast" services for Remote UEs that are not "served by EUTRAN". The ProSe UE-to-Network Relay shall relay unicast traffic (UL and DL) between the Remote UE and the network. The ProSe UE-to-Network Relay shall provide a generic function that can relay any type of traffic that is relevant for public safety communication.

The Lawful Interception, LI, method in 3GPP EPS (Evolved Packet System) systems is however only specified for intercept on non-ProSe enabled UEs, c.f. 3GPP TS 33.107 V12.11.0 (2015-06). It consists of an Evolved Packet Core, EPC, external entity called the Administration Function, ADMF.

The Lawful Interception, LI, method in 3GPP EPS systems is specified for intercept on non-ProSe enabled UEs. It consists of an Evolved Packet Core, EPC, external entity called the Administration Function, ADMF. FIG. 3 is a representation FIG. 1b: Packet Switched Intercept configuration of 3GPP TS 33.107 V12.11.0 (2015-06) of a configuration for the lawful interception. LEMF corresponds to Law Enforcement Monitoring Facility, GSN corresponds to e.g. nodes such as PGW, MME, etc.

AMDF can interface the EPC nodes and send requests towards the EPC nodes on an interface called the X1_1 interface in order to activate LI. It is activated for certain user identified by identities, e.g. International Mobile Subscriber Identity, IMSI, Mobile Station International Subscriber Directory Number, MSDISDN, or International Mobile Equipment Identity, IMEI. The EPC nodes reports LI information such as control information and/or user data payload on the X2 and X3 interfaces towards the EPC external LI system.

SUMMARY

It is object of the invention to be able to perform Lawful Intercept, LI, on UEs in a Proximity Services, ProSe, enabled Evolved Packet System, EPS.

This object has been accomplished by a method for a system comprising a remote User Entity, UE, being connected to a relay UE, the system moreover comprising, a Mobility Management Entity, MME, serving the relay UE and a Gateway, GW.

The method comprises the steps of
the remote UE starting to provide a proximity service to the relay UE as a UE-to-Network relay;
the relay UE transmitting in a message an identity of the remote UE and Internet Protocol, IP, address information of the remote UE to the MME serving the Relay UE;
the MME notifying the GW in a message comprising the identity of the remote UE and Internet protocol, IP, address information of the remote UE.

According to a further aspect there is provided a method for a User Entity, UE, acting as a relay UE for a remote UE. The method comprises
transmitting in a message an identity of the remote UE and Internet Protocol, IP, address information of the remote UE to a Mobility Management Entity, MME serving the Relay UE.

According to a still further aspect there is set forth a method for Mobility Management Entity, MME, serving a User Entity, UE, which is acting as a relay UE for a remote UE, the method comprising
upon receiving a message comprising an identity of the remote UE and an Internet Protocol, IP, address information of the remote UE, notifying a Gateway, GW, with a message comprising the identity of the remote UE and the Internet Protocol, IP, address information of the remote UE.

The object above has further been accomplished by a system comprising a remote UE being connected to a relay UE, the system moreover comprising, a MME serving the relay UE and a GW, the system being adapted for the remote UE starting to provide a proximity service to the relay UE as a UE-to-Network relay;

the relay UE transmitting in a message an identity of the remote UE and Internet Protocol, IP, address information of the remote UE to the MME serving the Relay UE;

the MME notifying the GW in a message comprising the identity of the re-mote UE and Internet protocol, IP, address information of the remote UE.

It is noted that the definition of the ProSe enabled EPS as of current 3GPP Rel. 13 specifications does not provide the basic functionality for enabling LI.

Further objects and advantages will appear from the following detailed description of embodiments of the invention.

BRIEF DESCRIPTION OF THE DRAWINGS

FIG. 1 shows basic elements 3GPP TS 23.303 V13.0.0 (2015-06), FIG. 4.2-3,

FIG. 2 shows basic elements 3GPP TS 23.303 V13.0.0 (2015-06), FIG. 4.4-3-1,

FIG. 3 shows basic elements of proximity services according to 3GPP TS 33.107 V12.11.0 (2015-06), FIG. 4 shows an embodiment of a method according to the invention for a Mobility Management Entity, MME entity or function.

DETAILED DESCRIPTION

According to an embodiment of the invention there is provided a method for performing LI on ProSe enabled Remote UEs consists of two phases:

The ADMF receives a request from an external authority to do LI on a particular IMSI identifying a subscriber. If the intercepted subscriber is using a UE currently acting as a Remote UE, the ADMF needs to get to know:

Which Relay UE IMSI is used by the intercepted remote UE IMSI

Which MME and PGW serves the Relay UE

Figure 5:
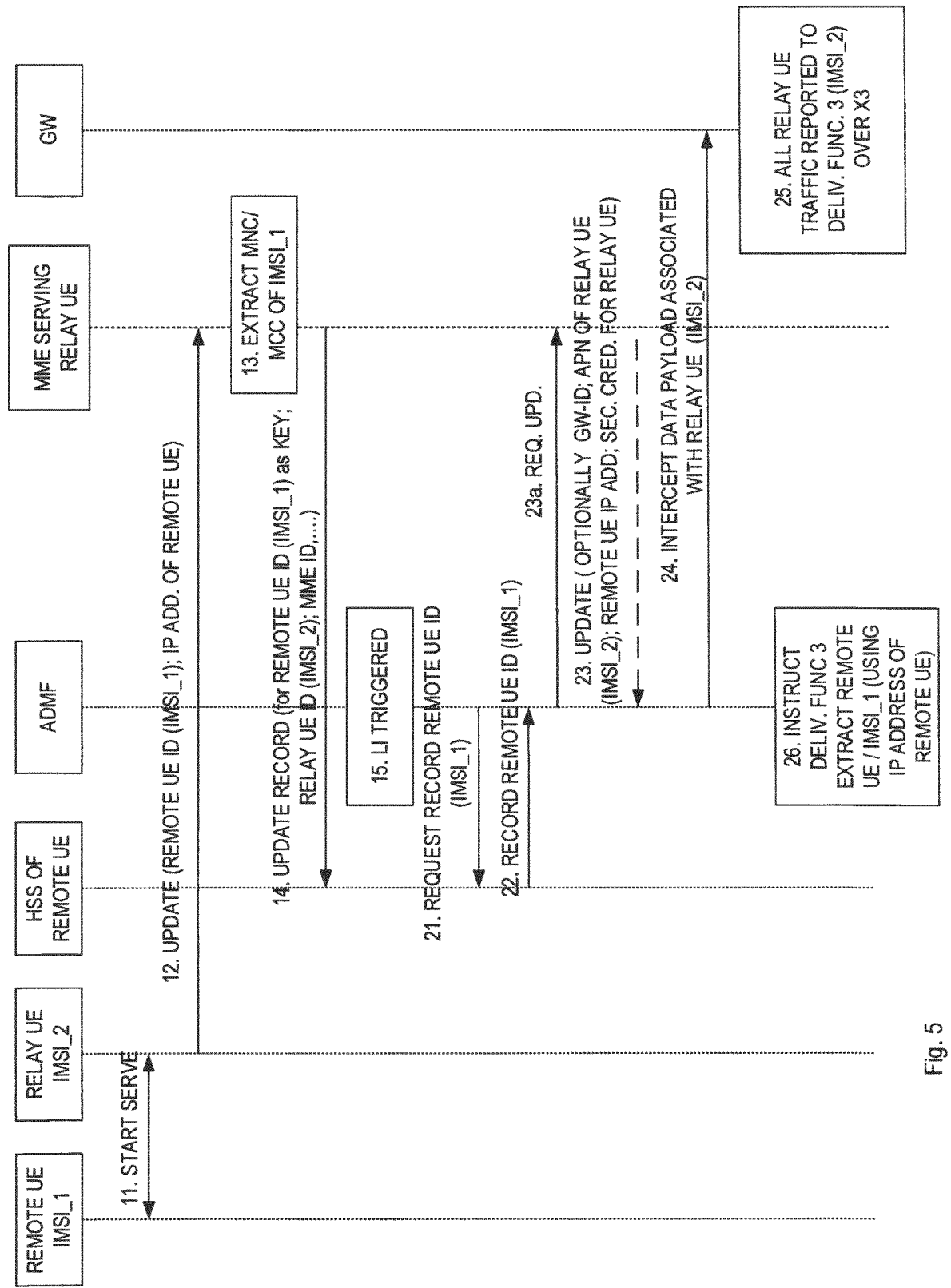
FIG. 5 shows a signalling diagram according to an embodiment of the invention.

A first embodiment is shown in FIG. 5.

Phase 1: The ADMF seeks to perform LI on a given UE. In the following examples the LI concerns the remote UE with an International Mobile Subscription Identity, IMSI, denoted IMSI_1. In order for the ADMF to carry oy the LI, a certain information exchange take place:

11. the Relay UE starts to provide proximity service to a Remote UE as a UE-to-NW (Network) Relay.

12. the Relay UE shall report the Remote UE IMSI (IMSI_1) and IP address information of the remote UE to the MME serving the Relay UE.

13 The MME extracts the Mobile National Code, MNC, and the Mobile Country Code, MCC, from the IMSI (IMSI_1) of the remote UE.

14. The Relay UE MME updates in an Update Record message having the Remote UE ID (value IMSI_1) as key, the HSS of the Remote UE with the Relay UE ID (IMSI_2) and the MME ID serving the Relay UE. An existing message such as the Update Location Request message from MME to HSS, or a new message, may be used. The information is used to update a record in the HSS with the remote UE ID as key. Additional information may be included in this message 14. For instance, all the data shown RECORD in FIG. 4 may be delivered.

It is noted that this requires that the Remote and Relay UEs operators have a roaming agreement.

The procedure is undertaken for a large portion of UE's as it cannot be known which particular UE's will be subject to LI.

Phase 2: Later on, when a LI event is triggered, 15 in the ADMF for a given UE (here IMSI_1 as example), the following is carried out:

21. ADMF requests the HSS of the intercepted subscriber using the Remote UE IMSI and the ADMF to get the Record of the Remote UE identifying the Relay UE ID and the MME ID of the Relay UE.

22. The HSS transmits a response back to the ADMF including the Record of the remote UE (in a database entry, the key is IMSI_1).

23a. The ADMF request an update from the MME serving the Relay UE.

23. The Relay UE MME can optionally provide missing entries in the record such as GW-ID (or APN) of the Relay UE to the ADMF. The Relay UE MME can also provide to the ADMF, IMSI of the Relay UE (IMSI_2) currently serving the Remote UE (and also the remote UE IP address) and security credentials for the Relay UE.

24. The ADMF triggers the GW of the Relay UE to intercept the data payload of the Relay UE identified by its IMSI, IMSI_2.

25. All Relay UE traffic (IMSI_2) is reported to Delivery Function 3. This traffic may include traffic for IMSI_1 and IMSI_2.

26. ADMF instructs the Delivery Function 3 to extract the remote UE traffic based on the IP address of the remote UE (IMSI_1) based on the IP address of the Remote UE.

It is noted that if more than one Remote UE is using the same Relay UE, the payload for all these Remote UEs may be reported by the GW, and it will be necessary to extract the payload of the UE triggering the intercept. This can be done in the external LI node after reporting, by using the IP address. It would also be possible for the GW of the Relay UE to extract the remote UE traffic itself and send this to the Delivery Function 3 even if it makes GW more complex (see below).

In FIG. 4, the steps carried out by the MME are shown in more detail. In step 10, the procedure is started. In step 12, the MME receives an update from the Relay UE. In step 13, the MME extracts the Mobile National Code, MNC, and the Mobile Country Code, MCC, from the IMSI (IMSI_1) of the remote UE. Finally, in step 14, the MME transmits an Update Record message to the HSS of the Remote UE. The aim of the message is to provide at least the first two records in the following Record for the remote UE, shown in FIG. 4:

The Record in the HSS of the remote UE contains with Key IMSI_1:
  Relay UE IMSI (or other ID)
  MME-ID of Relay UE
  IP-address of Remote UE
  APN (Access Point Name) of Relay UE
  GW-ID of Relay UE
  Also all information may be included in message 14.

The method above depends on that the LI system correlates the MME data with existing GW user plane data. An alternative method according to the invention is to transfer the information from the MME to GWs for the GW triggered events, i.e. that the MME sends the information correlating the Remote UE ID with the Relay UE ID to the S-GW and the P-GW (this would be sent in additional messages 15 (from MME to S-GW) and 16 (from S-GW to P-GW) at the end of phase 1 as described above). The LI system can trigger the LI in the GW by using the Remote UE ID (IMSI 1) as identifier, and it is up to the GW to find out which is the corresponding Relay UE, which PDN connection shall be intercepted and reported.

An alternative implementation of the storing of the relation between the Remote UE ID and the Relay UE ID would be in the ProSe Function (PF) where the ADMF could get the relation between the two.

Figure 6:
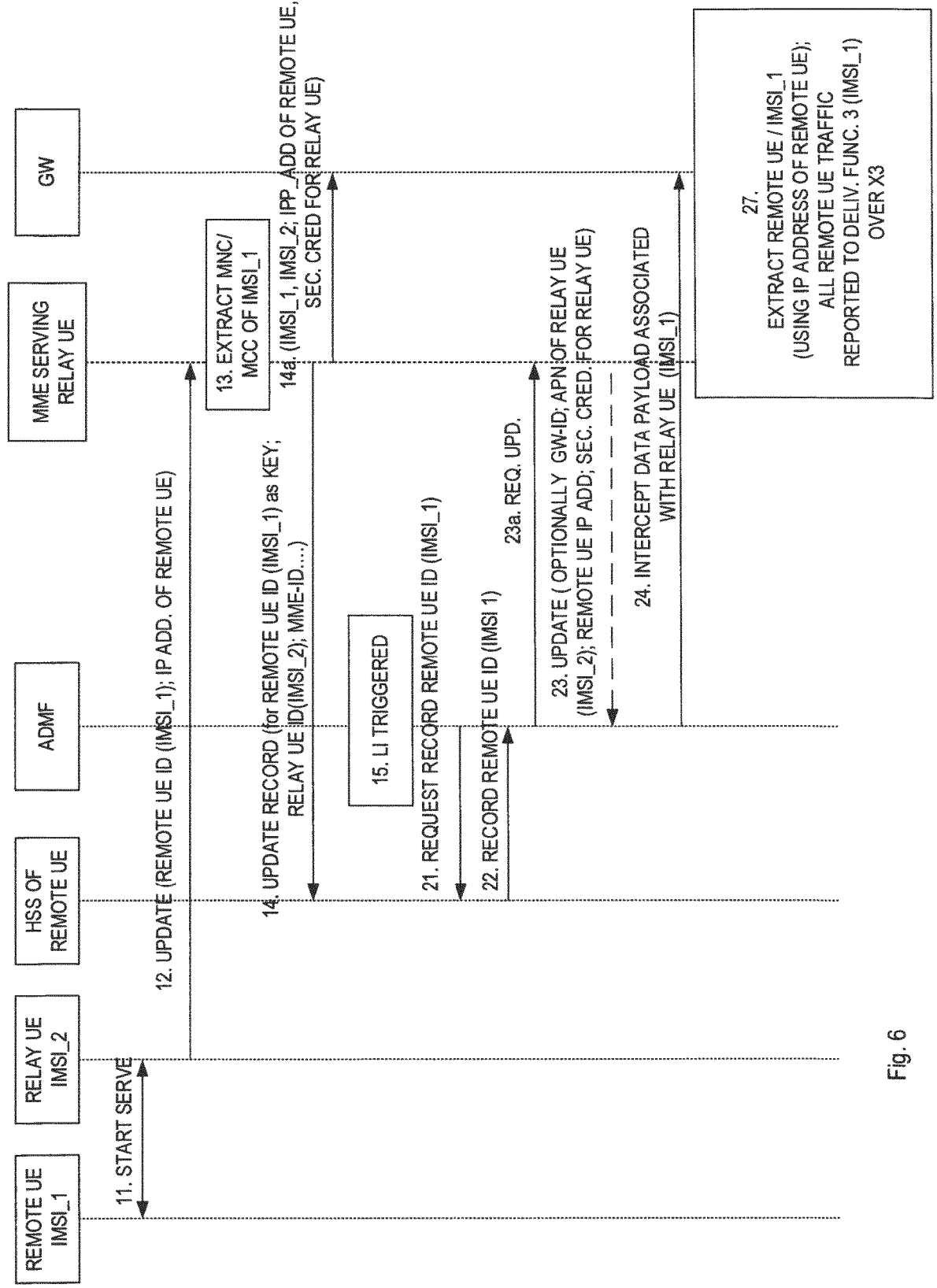
FIG. 6 shows an alternative embodiment.

In FIG. 6, an alternative embodiment is shown. Some messages are identical with those of FIG. 5 and are already described above in connection with FIG. 5, hence only differences will be explained.

In this embodiment, after message 14, the Gateway, GW, is notified by the MME of message 14a containing IMSI_1; the IMSI_2; the IP address of the remote UE; the security credentials for the Relay UE.

Later, in step 27, following the intercept message 24 from ADMF (containing IMSI_1), the Gateway extracts the Remote UE data using the IP address of the Remote UE and reports all UE traffic to Delivery Function 3 concerning IMSI_1. Thereby, the ADMF action 26 can be avoided.

In this embodiment, message 23 is optional.

As mentioned in connection with FIG. 4, the data record information provided by the MME to the HSS for the Remote UE storage comprises: Record in the HSS of the Remote UE: The Relay UE IMSI (or other ID); The MME-ID of the Relay UE; The IP-address of the Remote UE; The APN of the Relay UE; and The GW-ID of the Relay UE.

It is noted that the remote UE may have a dual MME registration in the HSS. First, in a MME where it was registered before connecting to the Relay UE; and also to the MME of the Relay UE as described here. With specific parameter names in the HSS for the two registered MMEs, this can avoid any confusion with having two MME registrations.

Figure 7:
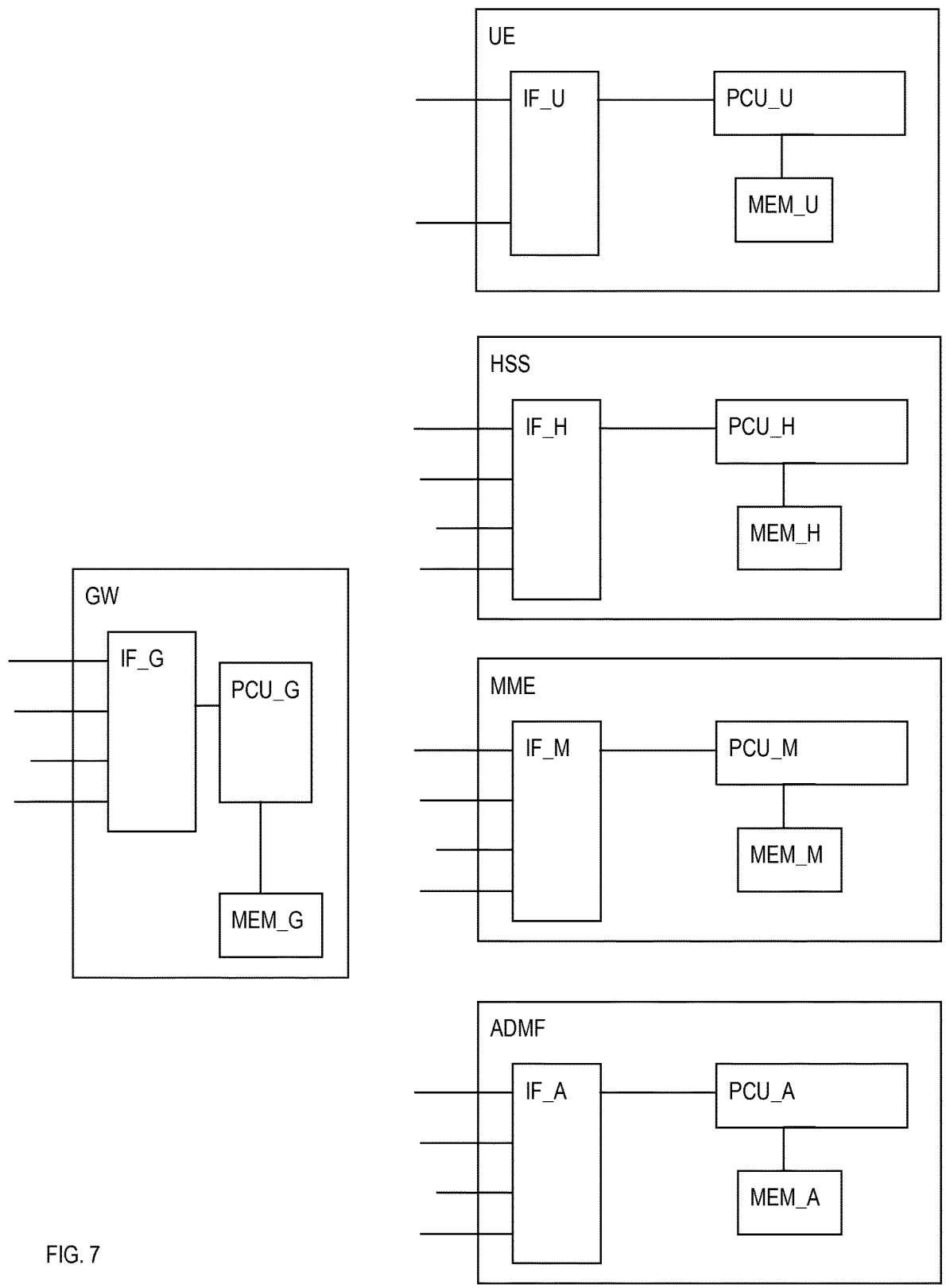
FIG. 7 shows implementations of a User Entity, UE; a Home Subscriber Server, HSS; a MME; an ADMF and a GW (Packet Data Network Gateway, P-GW, or Serving gateway, S-GW) according to the invention.

FIG. 7 shows implementations of a User Entity, UE; a Home Subscriber Server, HSS; a Mobility Management Entity, MME; an ADMF and a GW (Packet Data Network Gateway, P-GW, or Serving gateway, S-GW) according to the invention. These units may be implemented as apparatuses or functions.

The UE comprises a processor PCU_U, a memory MEM_U, the processor PCU_U being configured to carry out instructions contained in the memory MEM_U, and an interface IF_U though which the UE communicates. The instructions reflect the method or method steps described above.

The HSS comprises a processor PCU_H, a memory MEM_H, the processor PCU_H being configured to carry out instructions contained in the memory MEM_H, and an interface IF_H though which the HSS communicates. The instructions contained in the memory MEM_H reflect the method or method steps described above. The memory MEM_H moreover comprises a database concerning data described above.

The MME comprises a processor PCU_M, a memory MEM_M, the processor PCU_M being configured to carry out instructions contained in the memory MEM_M, and an interface IF_U though which the MME communicates. The instructions reflect the method or method steps described above. The memory MEM_M moreover comprises a database concerning data described above.

The ADMF comprises a processor PCU_A, a memory MEM_A, the processor PCU_A being configured to carry out instructions contained in the memory MEM_U, and an interface IF_A though which the ADMF communicates. The instructions reflect the method or method steps described above. The memory MEM_A moreover comprises a database concerning data described above.

The GW comprises a processor PCU_G, a memory MEM_G, the processor PCU_G being configured to carry out instructions contained in the memory MEM_G, and an interface IF_G though which the GW communicates. The instructions reflect the method or method steps described above. The memory MEM_G moreover comprises a database concerning data described above.

To summarize, according to embodiments of the invention there is provided:

A method for a system comprising a remote User Entity, UE, being connected to a relay UE, the system moreover comprising, a Mobility Management Entity, MME, serving the relay UE and a Gateway, GW.

The method comprises the steps of
  the remote UE starting (11) to provide a proximity service to the relay UE as a UE-to-Network relay;
  the relay UE transmitting in a message (12) an identity of the remote UE (IMSI_1) and Internet Protocol, IP, address information of the remote UE to the MME serving the Relay UE;
  the MME notifying (14a) the GW in a message comprising the identity of the re-mote UE (IMSI_1) and Internet protocol, IP, address information of the remote UE.

The system moreover may moreover comprise a Home Subscriber Server, HSS, of the remote UE, an Administration Function, ADMF, and a Delivery Function 3, and the method may further comprise
  the MME transmitting in an update record message (14) for the remote UE (IM-SI_1); the identity of a relay UE (IMSI_2) and the identity of the MME serving the relay UE, to the HSS of the remote UE;
  the ADMF transmitting a request message (21) for a remote UE to a HSS upon initiating lawful intercept, LI, the request message (21) comprising the identity of the remote UE (IMSI_1);
  the HSS transmitting a record for the remote UE to the ADMF, the record comprising an identity of the relay UE and the identity of the MME serving the relay UE;
  the GW reporting (25, 26) all traffic of the relay UE to the Delivery Function 3, up-on receiving an intercept message (24) from the ADMF.

There is also provided a method for a User Entity, UE, acting as a relay UE for a remote UE, the method comprising
  transmitting in a message (12) an identity of the remote UE (IMSI_1) and Internet Protocol, IP, address information of the remote UE to a Mobility Management Enti-ty, MME serving the Relay UE.

Prior to acting as a relay UE for the remote UE, the Relay UE is
   starting (11) to provide a proximity service, ProSe, to the remote UE as a UE-to-network relay.

According to another aspect, there is provided a method for Mobility Management Entity, MME, serving a User Entity, UE, which is acting as a relay UE for a remote UE, the method comprising
   upon receiving a message (12) comprising an identity of the remote UE (IMSI_1) and an Internet Protocol, IP, address information of the remote UE,
   notifying (14a) a Gateway, GW, with a message comprising the identity of the remote UE (IMSI_1) and the Internet Protocol, IP, address information of the remote UE.

For the MME serving a relay UE, the method may also comprise the step of
   transmitting further (14a) to the GW; an identity of the relay UE (IMSI_2) and security credentials for the Relay UE.

The MME is moreover being adapted for communicating with a Home Subscription Server, HSS. The method further comprises
   transmitting in an update record message (14) with an identity of a remote UE (IMSI_1) as key; an identity of the relay UE, for the remote UE, and an identity of the MME serving the relay UE, to the HSS of the remote UE.

There is moreover provided a method for an Administration Function, ADMF, the method comprising
   transmitting a request message (21) for a remote User Entity, UE, Record to a Home Subscriber Server, HSS, upon initiating (15) lawful intercept, LI, the request message (21) comprising an identity of a remote User Entity, UE.

There is also provided, for still further embodiments, a method for a Home Subscriber Server, HSS, the method comprising
   transmitting (22) a record for a remote UE to an Administration Function, ADMF, the record comprising an identity of a relay UE and an identity of a MME serving the relay UE.

The method for the HSS may further comprise transmitting in the record at least one of
   an Internet Protocol, IP, address of the remote UE,
   an Access Point Name, APN, of the relay UE,
   a Gateway, GW of the relay UE.

There is moreover provided a method for a Gateway, GW, according to another aspect of the invention, the method comprising
following an intercept message (24) from an Administration Function, ADMF, comprising an identity of a remote UE, either
   reporting (25) all traffic of a relay UE to a Delivery Function 3, upon receiving an intercept message (24) from an Administration Function, AMDF comprising an identity of the relay UE, or
   extracting data from the remote UE using the IP address of the remote UE;
   reporting (27) all UE traffic to a Delivery Function 3 concerning the remote UE.

According to some embodiments, the identity of the UE is an International Mobile Subscriber Identity, IMSI; Mobile Station International Subscriber Directory Number, MSDISDN; or International Mobile Equipment Identity, IMEI.

An administration Function, AMDF, is provided according to which the AMDF is
   instructing (26) a Delivery Function 3, to extract data related to a remote UE using an IP address of the remote UE.

According to a further embodiment of the invention there is provided a system comprising a remote UE being connected to a relay UE, the system moreover comprising, a MME serving the relay UE and a GW, the system being adapted for
   the remote UE starting (11) to provide a proximity service to the relay UE as a UE-to-Network relay;
   the relay UE transmitting in a message (12) an identity of the remote UE (IMSI_1) and Internet Protocol, IP, address information of the remote UE to the MME serving the Relay UE;
   the MME notifying (14a) the GW in a message comprising the identity of the re-mote UE (IMSI_1) and Internet protocol, IP, address information of the remote UE.

The system above may moreover comprise a HSS of the re-mote UE, an Administration Function, ADMF, and a Delivery Function 3, and the system further be adapted for
   the MME transmitting in an update record message (14) for the remote UE (IM-SI_1); the identity of a relay UE (IMSI_2) and the identity of the MME serving the relay UE, to the HSS of the remote UE;
   the ADMF transmitting a request message (21) for a remote UE to a HSS upon initiating lawful intercept, LI, the request message (21) comprising the identity of the remote UE (IMSI_1);
   the HSS transmitting a record for the remote UE to the ADMF, the record comprising an identity of the relay UE and the identity of the MME serving the relay UE;
   the GW reporting (25, 26) all traffic of the relay UE to the Delivery Function 3, up-on receiving an intercept message (24) from the AMDF.

In some embodiments of the system above, the UE may comprises an interface (IF_UE), a processor (PCU_UE) and a memory (MEM_UE); the MME may comprise an interface (IF_M), a processor (PCU_M) and a memory (MEM_M); and the GW may comprises an interface (IF_G), a processor (PCU_G) and a memory (MEM_G).

Alternatively, the MME and the GW may be instantiated in a cloud computing environment as virtual nodes, the cloud environment comprising at least a processor unit and memory unit.

The ProSe methods, functions and apparatuses described above provide valuable public safety functions and requirements in a 3GPP EPS system.

The invention claimed is:

1. A method for a system comprising a Mobility Management Entity (MME), an Evolved Packet Core Gateway (GW), and a relay user entity (UE) functioning as a UE-to-Network Relay for a remote UE, the MME serving the relay UE, the method comprising:
   the relay UE starting to provide a proximity service to the remote UE as a UE-to-Network relay;
   the relay UE transmitting to the MME serving the relay UE a report message comprising an identity of the remote UE and Internet Protocol (IP) address information of the remote UE; and
   the MME transmitting to the HSS of the remote UE an update record message for the remote UE, the update record message comprising the identity of the remote UE, an identity of the relay UE, and an identity of the MME serving the relay UE.

2. The method of claim 1, wherein the system further comprises a Home Subscriber Server (HSS) of the remote UE, an Administration Function (ADMF), and a Delivery Function 3, the method further comprising:
the ADMF transmitting a request message for the remote UE to the HSS upon initiating lawful intercept, the request message comprising the identity of the remote UE; and
the HSS transmitting a record for the remote UE to the ADMF, the record comprising the identity of the relay UE and the identity of the MME serving the relay UE.

3. The method of claim 1, wherein the identity of the remote UE is one of: an International Mobile Subscriber Identity (IMSI), a Mobile Station International Subscriber Directory Number (MSDISDN), and an International Mobile Equipment Identity (IMEI).

4. The method of claim 1, further comprising
the MME notifying the GW in a message comprising the identity of the remote UE and IP address information of the remote UE.

5. A method for a Mobility Management Entity (MME), wherein the MME serves a relay user entity (UE) that functions as a UE-to-Network Relay for a remote UE being connected to the relay UE, the method comprising:
the MME receiving a report message transmitted by the relay UE, the report message comprising an identity of the remote UE and Internet Protocol (IP) address information of the remote UE;
the MME, after receiving the report message, transmitting to a Home Subscription Server (HSS) of the remote UE an update record message comprising the identity of the remote UE, an identity of the relay UE, and an identity of the MME; and
the MME, after receiving the report message, transmitting toward a gateway (GW) a message comprising the identity of the remote UE and the IP address information of the remote UE, wherein
the GW is an Evolved Packet Core (EPC) GW.

6. The method of claim 5, further comprising the MME transmitting to the GW an identity of the relay UE and security credentials for the relay UE.

7. The method of claim 5, further comprising the MME serving the relay UE.

8. The method of claim 5, wherein the identity of the remote UE is one of: an International Mobile Subscriber Identity (IMSI), a Mobile Station International Subscriber Directory Number (MSDISDN), and an International Mobile Equipment Identity (IMEI).

9. A method in a system comprising a gateway (GW), a Mobility Management Entity (MME), and a relay user entity (UE) functioning as a UE-to-Network Relay for a remote UE, the method comprising:
the GW receiving a message transmitted by the MME, the message comprising: an identity of the remote UE and Internet Protocol (IP) address information of the remote UE;
the GW receiving an intercept message transmitted by an Administration Function (ADMF), the intercept message comprising UE identity information, the UE identity information being one of: i) an identity of the relay UE or ii) an identity of the remote UE; and
after receiving the intercept message transmitted by the ADMF, the GW performing the steps of:
using the UE identity information included in the intercept message to retrieve the IP address information of the remote UE,
receiving traffic transmitted by the relay UE, the received traffic transmitted by the relay UE comprising data transmitted by the remote UE,
using the IP address information of the remote UE to extract from the received traffic that was transmitted by the relay UE the data transmitted by the remote UE, and
reporting to a delivery function the extracted data transmitted by the remote UE.

10. A system, the system comprising:
a Mobility Management Entity (MME);
an Evolved Packet Core Gateway (GW); and
a relay user entity (UE) functioning as a UE-to-Network Relay for a remote UE, the MME serving the relay UE, wherein
the relay UE is adapted for starting to provide a proximity service to the remote UE as a UE-to-Network relay;
the relay UE being adapted for transmitting to the MME serving the relay UE a report message comprising remote UE identification information comprising i) an identity (ID) of the remote UE and ii) Internet Protocol (IP) address information of the remote UE; and
the MME being adapted to receive the report message and transmit toward the GW the received remote UE identification information comprising i) the ID of the remote UE and ii) the IP address information of the remote UE, wherein the MME is further adapted to:
transmit to a Home Subscription Server (HSS) of the remote UE an update record message comprising the ID of the remote UE, an identity of the relay UE, and an identity of the MME.

11. The system of claim 10, wherein the system further comprises:
an Administration Function (ADMF); and
a delivery function, wherein
the ADMF is configured to transmit a request message for a remote UE to the HSS upon initiating lawful intercept, the request message comprising the identity of the remote UE; and
the HSS is configured to transmit to the ADMF a record for the remote UE, the record comprising an identity of the relay UE and the identity of the MME serving the relay UE.

12. The system of claim 11, wherein the MME and the GW are instantiated in a cloud computing environment as virtual nodes, the cloud environment comprising at least a processor unit and memory unit.

13. The system according to claim 10, wherein
the UE comprises an interface, a processor, and a memory;
the MME comprises an interface, a processor, and a memory; and
the GW comprises an interface, a processor and a memory.

14. A Mobility Management Entity (MME), the MME comprising:
memory; and
processing circuitry coupled to the memory, wherein the MME is configured to:
serve a relay user entity (UE) that functions as a UE-to-Network Relay for a remote UE;
receive a report message transmitted by the relay UE, the report message comprising remote UE identification information comprising: i) an identity (ID) of the remote UE and ii) Internet Protocol (IP) address information of the remote UE; and
after receiving the report message, transmit toward the GW the received remote UE information comprising: i)

the ID of the remote UE and ii) the IP address information of the remote UE, wherein the MME is further configured to:
transmit to a Home Subscription Server (HSS) of the remote UE an update record message comprising the ID of the remote UE, an identity of the relay UE, and an identity of the MME.

15. The MME of claim 14, wherein the MME comprises an interface, a processor, and a memory.

16. The MME of claim 14, wherein the MME is further configured to transmit to the GW an identity of the relay UE and security credentials for the relay UE.

17. An Evolved Packet Core Gateway (EPC-GW), the EPC-GW comprising:
a receiver for: i) receiving a message transmitted by a management entity (ME), the message comprising: an identity of a remote user entity (UE) and Internet Protocol (IP) address information of the remote UE and ii) receiving an intercept message transmitted by an Administration Function (ADMF), the intercept message comprising UE identity information, the UE identity information being one of: i) an identity of a relay UE providing a relay service to the remote UE or ii) an identity of the remote UE; and
processing circuitry configured to:
use the UE identity information included in the intercept message to retrieve the IP address information of the remote UE;
use the retrieved IP address information of the remote UE to extract from traffic transmitted by the relay UE data transmitted by the remote UE; and
report to a delivery function the extracted data transmitted by the remote UE.

18. The EPC-GW of claim 17, wherein the EPC-GW comprises an interface, a processor, and a memory.

* * * * *